United States Patent [19]

Tanaka

[11] Patent Number: 5,798,793
[45] Date of Patent: Aug. 25, 1998

[54] AUTOMATIC FOCUSING DEVICE CAPABLE OF DETECTING PANNING

[75] Inventor: Taeko Tanaka, Yokohama, Japan

[73] Assignee: Canon Kabushiki Kaisha, Tokyo, Japan

[21] Appl. No.: 863,376

[22] Filed: May 27, 1997

Related U.S. Application Data

[63] Continuation of Ser. No. 460,571, Jun. 2, 1995, abandoned, which is a continuation of Ser. No. 86,832, Jul. 7, 1993, abandoned.

[30] Foreign Application Priority Data

Jul. 10, 1992 [JP] Japan .................. 4-183994

[51] Int. Cl.$^6$ ............... G03B 13/00; H04N 5/232; H04N 5/238
[52] U.S. Cl. .............. 348/347; 348/353; 348/365; 396/89
[58] Field of Search ................ 348/207, 208, 348/221, 345, 346, 347, 353, 354, 362, 363, 364, 365; 396/63, 79, 89

[56] References Cited

U.S. PATENT DOCUMENTS

| | | |
|---|---|---|
| 4,531,158 | 7/1985 | Murakami et al. ............ 348/347 |
| 4,672,456 | 6/1987 | Murai et al. ............ 358/227 |
| 4,833,541 | 5/1989 | Takuma et al. ............ 348/347 |
| 4,912,493 | 3/1990 | Tanaka ............ 354/400 |
| 4,967,280 | 10/1990 | Takuma et al. ............ 358/227 |
| 5,053,798 | 10/1991 | Ohara et al. ............ 354/400 |
| 5,057,927 | 10/1991 | Hieda ............ 348/363 |
| 5,072,250 | 12/1991 | Makino ............ 354/402 |
| 5,194,888 | 3/1993 | Akashi et al. ............ 354/402 |
| 5,212,598 | 5/1993 | Kikuchi ............ 348/347 |
| 5,247,326 | 9/1993 | Taniguchi et al. ............ 354/402 |

*Primary Examiner*—Bipin Shalwala
*Attorney, Agent, or Firm*—Fitzpatrick, Cella, Harper & Scinto

[57] ABSTRACT

An automatic focusing device includes an image pickup device for outputting an image signal by performing photoelectric conversion of an image of an object, a band-pass filter for extracting a sharpness signal corresponding to the sharpness from among the image signal, a diaphragm for controlling the amount of light incident upon the image pickup device, and a control circuit for controlling prohibition of the drive of a focusing lens based on a change in the sharpness signal output from the band-pass filter and a change in the state of the diaphragm. It is thereby possible to exactly detect an operation, such as panning or the like, and to prevent the stop of the focusing lens at a defocused position caused by an erroneous operation by prohibiting the drive of the focusing lens when panning has been detected.

30 Claims, 6 Drawing Sheets

LEVEL OF DEPTH OF FIELD

FIG.4 (a)

| FNO. | 1.4~2.0 | ~2.8 | ~4.0 | ~5.6 | ~8.0 | ~11 | ~ |
|---|---|---|---|---|---|---|---|
| LEVEL OF DEPTH OF FIELD | 1 | 1 | 2 | 2 | 3 | 3 | 4 |

FIG.4 (b)

| f \ FNO. | ~2.0 | ~2.8 | ~4.0 | ~5.6 | ~8.0 | ~11 | ~ |
|---|---|---|---|---|---|---|---|
| 80~58mm | 0 | 0 | 1 | 1 | 2 | 2 | 3 |
| ~40 | 1 | 1 | 2 | 2 | 3 | 3 | 4 |
| ~28 | 2 | 2 | 3 | 3 | 4 | 4 | 5 |
| ~20 | 3 | 3 | 4 | 4 | 5 | 5 | 5 |
| ~14 | 4 | 4 | 5 | 5 | 6 | 6 | 6 |
| ~0 | 5 | 5 | 6 | 6 | 6 | 6 | 6 |

FIG.5

| LEVEL OF DEPTH OF FIELD | 1 | 2 | 3 | 4 | 5 | 6 | (%) |
|---|---|---|---|---|---|---|---|
| TH1 | 3 5 | 4 0 | 4 5 | 5 0 | 5 5 | 6 0 | PERCENTAGE WITH RESPECT TO PEAK LEVEL AT FOCUS POINT (%) |

FIG.6

| FNO. | 1,4 ~2,0 | ~2.8 | ~4.0 | ~5.6 | ~8.0 | ~11 | ~ |
|---|---|---|---|---|---|---|---|
| iris VALUE OF DIAPHRAGM ENCODER | 255 ~151 | ~131 | ~116 | ~105 | ~97 | ~92 | |
| TH2 | 2 0 | 1 6 | 1 2 | 8 | 6 | 4 | DIFFERENCE VALUE OF ENCODER |

FIG.7

AUTOMATIC FOCUSING DEVICE CAPABLE OF DETECTING PANNING

This application is a continuation of application No. 08/460,571 now abandoned filed Jun. 2, 1995 which is a continuation of application Ser. No. 08/086,832, filed Jul. 7, 1993, now abandoned.

BACKGROUND OF THE INVENTION

1. Field of the Invention

This invention relates to an automatic focusing device which performs focus adjustment using an image signal.

2. Description of the Related Art

For video cameras or the like, a method has been known in which the focus is adjusted by detecting the sharpness of a picture frame using an image signal representing an image of an object output from an image pickup device or the like, and controlling the position of a focusing lens so that the sharpness has a maximum value.

In general, for evaluating sharpness in such a method, for example, the intensity of the high-frequency component in an image signal extracted by a band-pass filter (hereinafter abbreviated as a BPF), or the detected intensity of the amount of defocus in an image signal extracted by a differentiating circuit or the like is used.

These evaluation values have mountain-like characteristics in which, when a normal object is photographed, each value is small in a defocused state, increases as the state approaches an in-focus state, and reaches a maximum value in a complete in-focus state.

Accordingly, the focusing lens is controlled such that the lens is driven in the direction of increasing the sharpness at a high speed when the sharpness has a small value, the driving speed is reduced as the sharpness increases, so that the lens stops at the summit of the mountain of a characteristic curve with high accuracy.

Such an autofocus method is generally called a "mountaineering autofocus method (hereinafter termed an mountaineering AF)".

However, an automatic focusing device utilizing an image signal has the property that when an image signal, that is, a sharpness signal, has changed, a focusing lens starts to move assuming that the object has changed.

If, for example, panning is performed, the image flows and therefore the spatial frequency decreases, causing a decrease in the level of the sharpness signal. Due to this change in the image, a focus detection circuit determines that the state leaves an in-focus state and moves the focusing lens. When the panning operation has been completed, the image stops flowing and therefore the level of the sharpness signal tends to increase even though the state is not in an in-focus state. Hence, when the panning operation has been completed, even though the state is not in an in-focus state, the focusing lens stops at a defocused position where the lens is situated at that time.

That is, even though the relative position between the object and the camera has not changed, erroneous operations frequently occur such that the focusing lens restarts every time panning is performed, and stops at a defocused position even if an in-focus state is not provided when panning has been completed, causing very important problems for video cameras for photographing moving pictures.

SUMMARY OF THE INVENTION

It is an object of the present invention to solve the above-described problems.

It is another object of the present invention to provide an automatic focus adjusting device in which no erroneous operation is present by exactly discriminating a change in a focus signal caused by a relative movement between an object and a camera from a change in an in-focus state.

It is still another object of the present invention to provide an automatic focus adjusting device in which an erroneous operation during panning is prevented.

It is yet another object of the present invention to provide an automatic focus adjusting device in which the stop of a focusing lens at a defocused state after the completion of panning is prevented.

According to one aspect, the present invention which achieves these objectives relates to an automatic focusing device comprising image pickup means for outputting an image signal by performing photoelectric conversion of an image of an object, extraction means for extracting a sharpness signal in accordance with the sharpness from among the image signal, a diaphragm for controlling the amount of light incident upon the image pickup means, and control means for controlling prohibition of the drive of a focusing lens based on a change in the sharpness signal output from the extraction means and a change in the state of the diaphragm.

According to another aspect, the present invention which achieves these objectives relates to an automatic focusing device comprising image pickup means for outputting an image signal by performing photoelectric conversion of an image of an object, detection means for detecting the contrast of the image of the object from among the image signal, a diaphragm for controlling the amount of light incident upon the image pickup means, and control means for controlling prohibition of the drive of a focusing lens based on changes in the contrast detected by the detection means and the state of the diaphragm.

It is thereby possible to exactly detect an operation, such as panning or the like, and to prevent the stop of a focusing lens at a defocused position caused by an erroneous operation by prohibiting the driving of the focusing lens when panning has been detected.

These and other objects, advantages and features of the present invention will become more apparent from the following detailed description of the preferred embodiments taken in conjunction with the accompanying drawings.

DETAILED DESCRIPTION OF THE PREFERRED EMBODIMENTS

A description will now be provided of an automatic focusing device according to an embodiment of the present invention with reference to the drawings.

Figure 1:
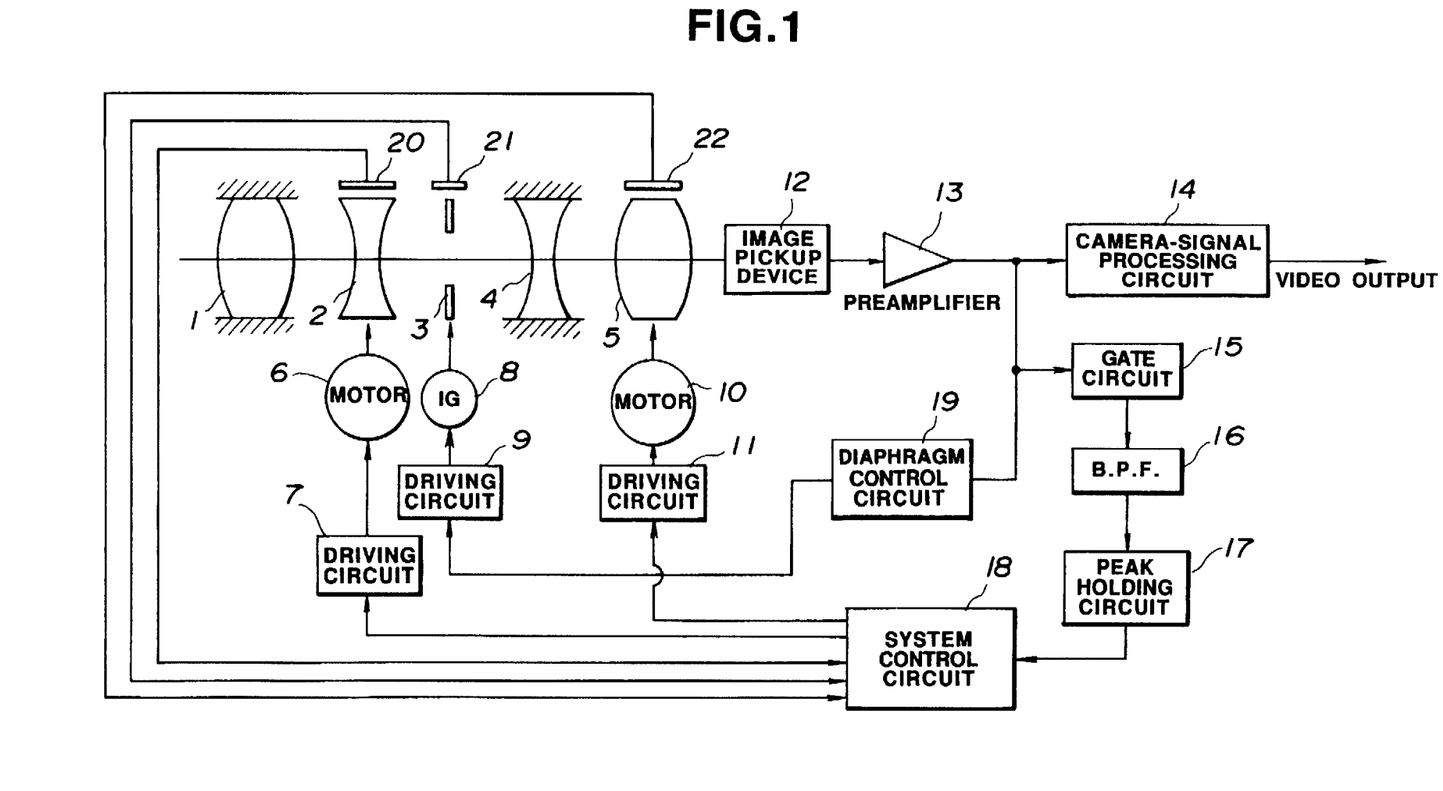
FIGS. 1 is a block diagram illustrating an automatic focusing device according to an embodiment of the present invention.

FIG. 1 is a block diagram illustrating the case in which the automatic focusing device of the present embodiment is applied to a video camera.

In FIG. 1, there are shown fixed front-side lens 1, magnification-varying lens 2 for performing a zooming operation, diaphragm 3 for limiting the amount of incident light, fixed lens 4, focusing lens 5 for performing focus adjustment and correcting the displacement of the focal plane caused by the drive of magnification-varying lens 2, zoom motor 6 for driving magnification-varying lens 2, driving circuit 7 for motor 6, motor or IG meter 8 for driving diaphragm 3, driving circuit 9 for driving motor 8, focus motor 10 for driving focusing lens 5, and driving circuit 11 for focus motor 10. These driving circuits are controlled by a system control circuit (to be described later).

Image pickup device 12, such as a CCD (charge-coupled device) or the like, performs photoelectric conversion of an image of an object imaged onto the image pickup surface by the above-described lenses. Preamplifier 13 amplifies an image signal output from image pickup device 12 to a predetermined level. Camera-signal processing circuit 14 converts the image signal output from preamplifier 13 into a normalized image signal by performing predetermined signal processing, such as gamma correction, blanking processing, addition of a synchronizing signal, and the like, and outputs the normalized image signal to a video cassette recorder, a monitor device or the like (not shown).

Gate circuit 15 obtains only an image signal corresponding to a range on the image pickup surface in which focus detection is performed, i.e., a focus detection region, from among the image signal output from image pickup device 12. Band-pass filter (BPF) 16 extracts a high-frequency component, i.e., a sharpness signal, which changes in accordance the focus state from among the image signal obtained by gate circuit 15. Peak holding circuit 17 detects the peak value in the high-frequency component output from band-pass filter 16 for each field. System control circuit 18 obtains the peak value in the high-frequency component output from the peak-holding circuit 17 for each field, and detects the direction of the drive of the focusing lens, the driving speed and the focus point, and determines restart of the focusing lens in accordance with an increase or a decrease of the peak value. The system control circuit 18 comprises a microcomputer. That is, the autofocus control algorithm of the present invention is performed in synchronization with each field of the television signal, so that the peak level of the high-frequency component is obtained for each field to output a focusing-lens driving signal.

Diaphragm control circuit 19 obtains the luminance level of the image signal output from preamplifier 13, outputs a diaphragm control signal to driver 9 so that the luminance level becomes constant, controls the diaphragm by driving IG meter 8, and thereby controls the amount of incident light.

Zoom encoder 20 detects the position of magnification-varying lens 2, diaphragm encoder 21 detects the position of diaphragm 3, and focus encoder 22 detects the position of focusing lens 5. The detection values of the respective encoders are supplied to system control circuit 18, and are used for various kinds of controls. That is, the detection outputs of the respective encoders are used for calculating a correction value for correcting the displacement of the focal plane caused by the movement of the magnification-varying lens, and a focusing-lens driving signal in consideration of the depth of field and the like. In particular, as will be described later, the diaphragm encoder 21 is used also for detecting a change in the object due to panning or the like.

The automatic focusing device of the present embodiment has the above-described configuration. Next, the control operation performed by the system control circuit 18 will be described with reference to the flowchart of FIG. 2.

Figure 2:
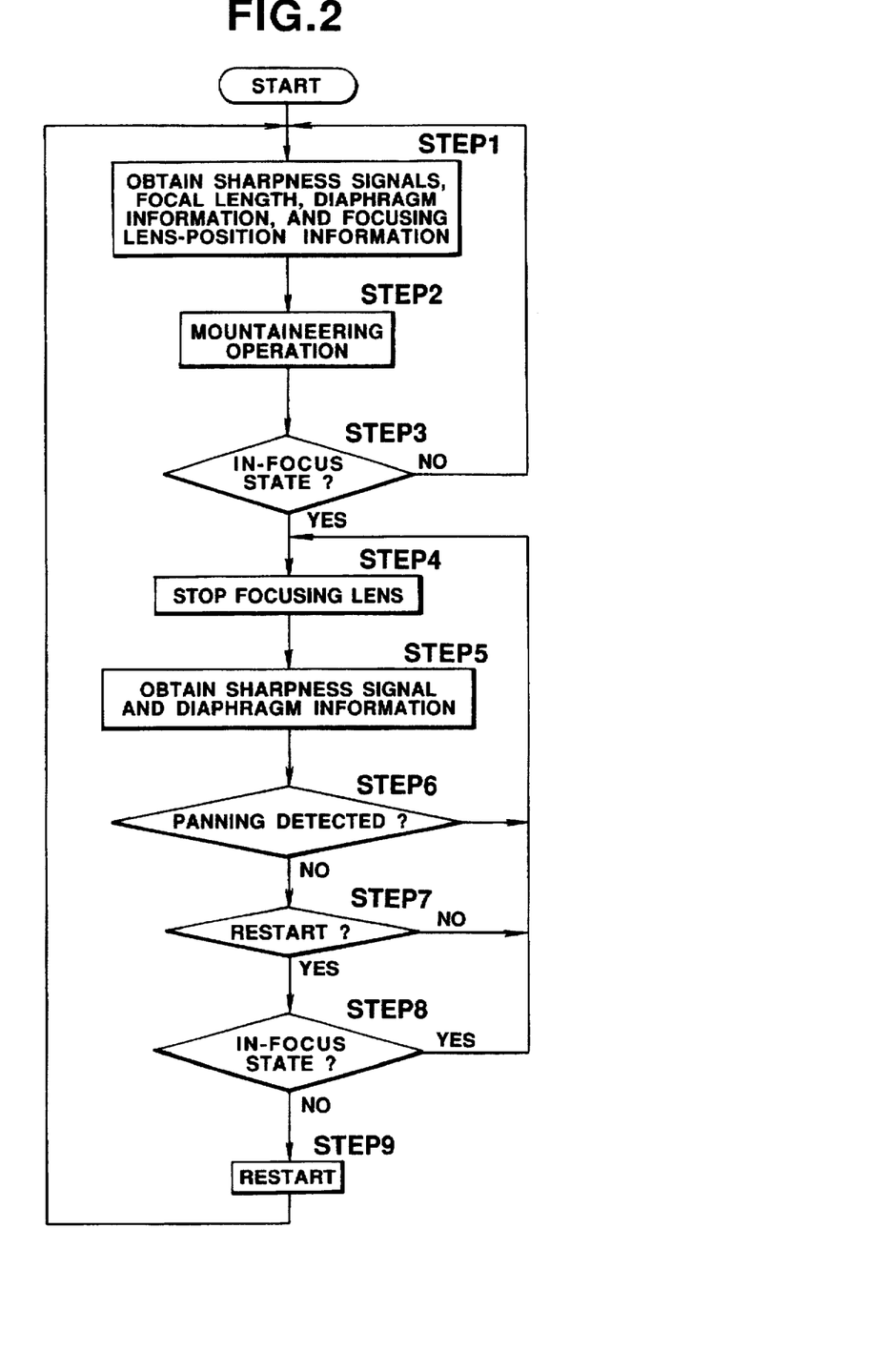
FIG. 2 is a flowchart illustrating the operation of the automatic focusing device of the embodiment.

When the control operation has been started, first, in step 1, the peak value of the high-frequency component in the image signal as the evaluation value of sharpness, stop-value information, focal-length information and focusing-lens-position information are obtained from peak holding circuit 17, diaphragm encoder 21, zoom encoder 20 and focus encoder 22, respectively.

In step 2, a mountaineering AF operation is performed by driving focusing lens 5 in the direction of increasing the level of the sharpness signal based on the above-described information. In step 3, it is determined whether or not the current state is an in-focus state. If the result of the determination is negative, that is, the level of the high-frequency component tends to increase or decrease and does not have a maximum value, the process returns to step 1, in which new values of various kinds of parameters are obtained and the mountaineering AF operation is repeated. If the result of the determination in step 3 is affirmative, the process proceeds to step 4, in which the focusing lens 5 is stopped.

After the focusing lens 5 has been stopped, the process proceeds to step 5, in which the sharpness signal, i.e., the level of the high-frequency component, and stop-value information are obtained, and the mode moves to a panning detection mode using the sharpness signal, i.e. the level of the high-frequency component, and the stop-value information. Panning detection is performed based on the sharpness signal and the stop-value information obtained in step 5. The details of this operation will be described later.

When it has been determined in step 6 that panning has been detected, the process returns to step 4, in which the focusing lens is kept stopped irrespective of the presence of the sharpness signal. When it has been determined in step 6 that panning has not been detected, the process proceeds to step 7, in which a change in the object is detected from a change in the sharpness signal, and it is determined whether or not the focusing lens must be restarted.

If it has been determined in step 7 that a change in the object has not been detected and therefore the focusing lens must not be restarted, the process returns to step 4, in which the processes of steps 5 and 6 are repeated while keeping the focusing lens stopped.

If it has been determined in step 7 that a large amount of change has been detected in the object from a change in the sharpness signal and therefore the focusing lens must be restarted, the process proceeds to step 8, in which it is determined whether or not the current state is an in-focus state. If the result of the determination is affirmative, the process returns to step 4, in which the focusing lens is kept stopped. It is thereby possible to prevent an erroneous operation of the focusing lens due to instantaneous noise or the like.

If the result of the determination in step 8 is negative, the process proceeds to step 9, in which the focusing lens is restarted and the process then returns to step 1, in which new values of various kinds of parameters are obtained, the above-described processes are repeated, and the focusing lens is driven to a new focus point.

The above-described control operation is performed in synchronization with each field.

Figure 3:
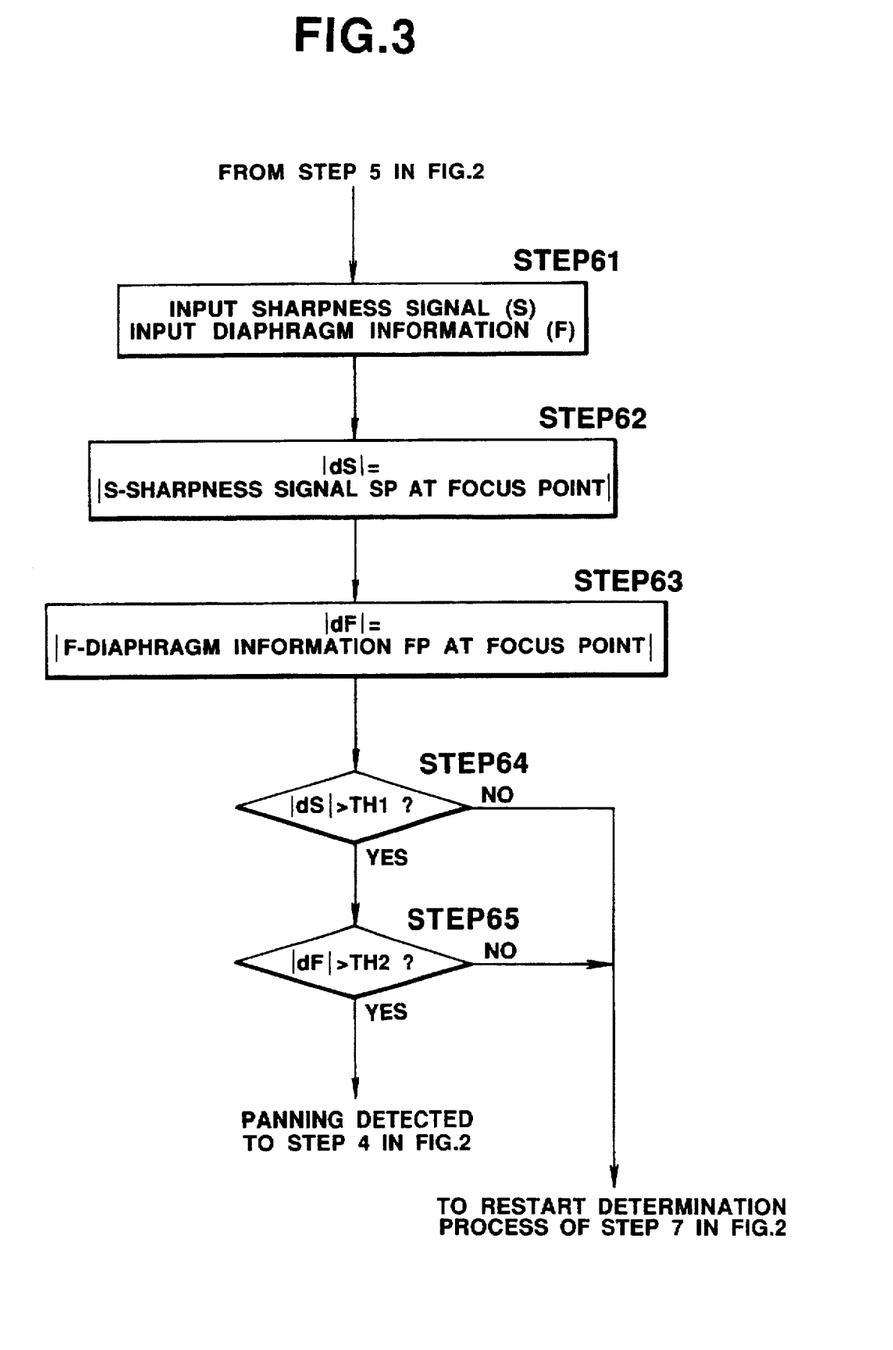
FIG. 3 is a flowchart illustrating panning detection processing in the flowchart shown in FIG. 2.

Next, a description will be provided of the panning detection process in step 6 of the above-described flowchart with reference to the flowchart of FIG. 3.

According to the present invention, panning is detected based on changes in the sharpness signal and the stop-value information. That is, if panning is performed, since the object flows with respect to the camera, the spatial frequency is reduced, causing a decrease in sharpness. However, it is difficult to discriminate whether the object has changed or panning has been performed only from the above-described results. Hence, in the present invention, a change in the stop value is used for the determination of panning together with a change in sharpness. This is based on the following phenomenon. That is, during panning, since the image abruptly changes, light incident upon the image pickup device diverges, causing an unstable operation of the diaphragm. As a result, the value of the diaphragm encoder tends to change unstably and minutely.

In FIG. 3, when the control has been started, first, in step 61, data of the sharpness signal S and the stop-value information F are input. In step 62, the difference value dS between the sharpness signal S and the sharpness signal SP at the focus point (indicating the peak value of the sharpness signal) is calculated, and its absolute value |dS| is obtained. In step 63, the difference value dF between the current stop value F and the stop value FP at the focus point is calculated, and its absolute value |dF| is obtained.

In step 64, the value |dS| is compared with a predetermined threshold value TH1. If the value |dS| is greater than the threshold value TH1, the process proceeds to step 65. If the value dS is equal to or smaller than the threshold value TH1 is determined that panning has not been performed since a change of at least the predetermined value is not recognized in the sharpness of the object, and the process returns to the restart determination process in step 7 of the flowchart of FIG. 2.

In the process of step 64, the threshold value TH1 changes in accordance with the depth of field and the sharpness signal SP at the focus point. As the depth of field increases, the mountain of the luminance signal in the image signal has less steep characteristics, and the mountain of the signal representing the sharpness, such as the high-frequency component or the like, also has less steep characteristics. Hence, it becomes difficult to detect a change in the sharpness signal, that is, the difference value |dS|. Also when the contrast of the object is low and the sharpness-signal level SP at the focus point has a small value, it becomes difficult to detect the value of the difference value |dS|.

Accordingly, by setting the value corresponding to A % of the sharpness-signal level SP at the focus point as a threshold value, and changing the value of the A % in accordance with the depth of field, variations in characteristics due to the object are prevented. As a result, a threshold value TH1 which is not influenced by the object and the depth of field is obtained.

In step 65, the absolute value |dF| of the difference value between the current stop value F and the stop value at the focus point is compared with a predetermined threshold value TH2. If the absolute value |dF| is greater than the threshold value TH2, that is, if a change in the stop value is greater than TH2, it is determined that panning has been performed, and the process proceeds to step 4 shown in the flowchart of FIG. 2.

If the value |dF| is equal to or less than the threshold value TH2, it is determined that panning has not been performed, and the process proceeds to the restart determination process in step 7 shown in the flowchart of FIG. 2.

By repeating the above-described operation, panning can always be detected on a real-time base.

The above-described threshold value TH2 depends on the stop value at the focus point. Since the resolution of the stop-value information decreases as the stop value decreases, a change in the amount of actual light (the F number) increases even if a change in the diaphragm is small. Accordingly, the threshold value TH2 decreases as the stop value FP at the focus point decreases. Hence, the threshold value TH2 must be changed in accordance with the depth of field.

Figure 4A:
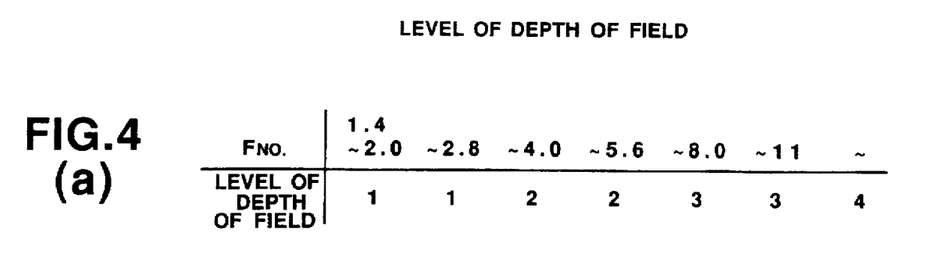
FIGS. 4(a) and 4(b) are diagrams illustrating data tables indicating the level of the depth of field.
Figure 4B:
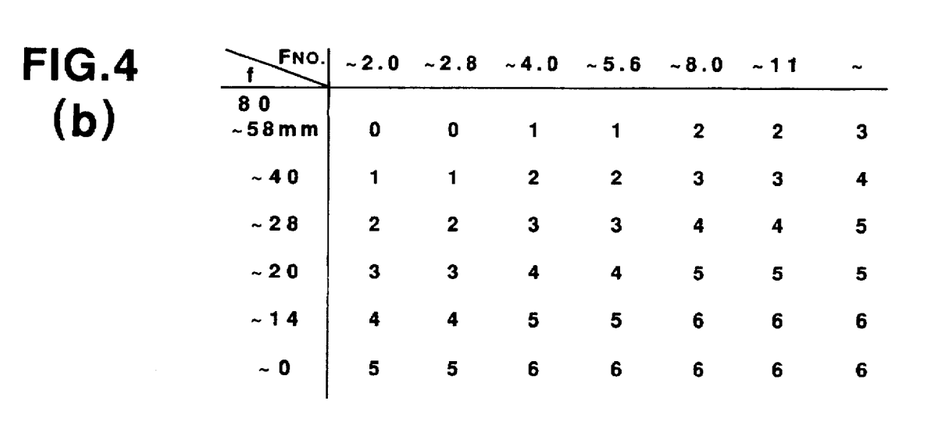

FIGS. 4(a) and 4(b) indicate the level of the depth of field as functions of the stop value and the focal length. FIG. 4(a) illustrates a case in which the level of the depth of field is classified as a function of the stop value (F number). FIG. 4(b) illustrates another case in which the level of the depth of field is classified as functions of the stop value (F number) and the focal length. Accordingly, by storing these tables in an ROM (read-only memory) within the system control circuit, an external memory or the like, the optimum threshold value can always be set in accordance with the photographing state at each time.

Figure 5:
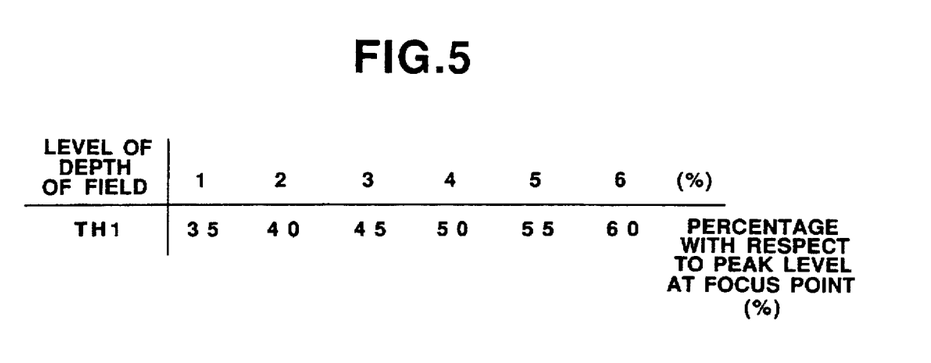
FIG. 5 is a diagram illustrating a data table which stores the relationship between the threshold value TH1 for discriminating a change in sharpness, and the level of the depth of field.
Figure 6:
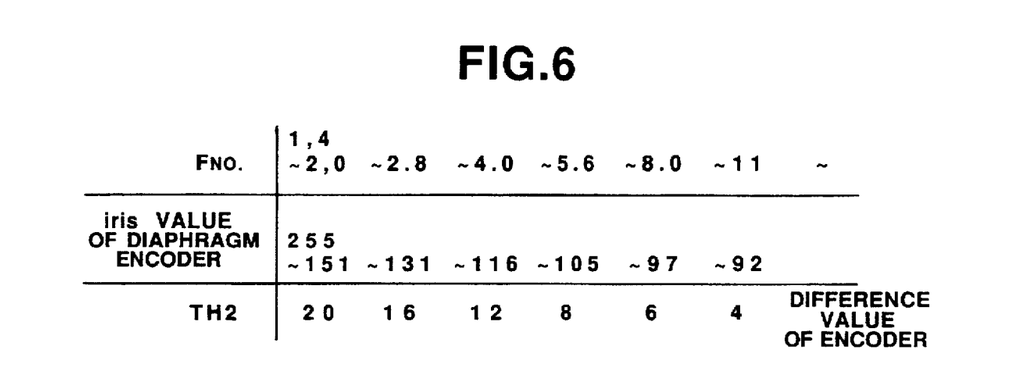
FIG. 6 is a diagram illustrating a data table which stores the relationship between the threshold value TH2 for discriminating a change in the stop value, and the value of a diaphragm encoder.

FIGS. 5 and 6 are data tables for setting the threshold values used when the threshold values TH1 and TH2 are actually determined using the level of the depth of field selected from the data tables shown in FIGS. 4(a) and 4(b). FIG. 5 is a data table indicating the relationship between the level of the depth of field and the threshold value TH1 for determinating a change in the sharpness. In FIG. 5, the threshold value TH1 is represented by the percentage (%) to the sharpness level at the focus point.

FIG. 6 is data table indicating the relationship between the stop value (F number) and the range of the value of the diaphragm encoder corresponding to the range of the stop value, and the threshold value TH2 corresponding to each of the above-described ranges. The threshold value TH2 corresponds to the amount of a change in the diaphragm encoder, i.e., the difference value.

As described above, in the present invention, when the sharpness signal and the stop value have changed by at least respective predetermined threshold values, it is determined that panning has been performed. Hence, the movement of the object and the movement of the camera, such as panning or the like, can be exactly discriminated. When panning has been detected, the drive of the focusing lens is prohibited, whereby the problem that the focusing lens stops at a defocused position due to a misoperation can be solved. Furthermore, since the threshold value is changed in accordance with the photographing state, high accuracy in detection can be obtained.

In the above-described embodiment, when panning has been detected, the above-described operation is repeated until panning is not detected, and the movement of the focusing lens is prohibited. However, the restart of the focusing lens may be prohibited only for a predetermined time period when panning has been detected. The stop of the focusing lens at a defocused position may also be prevented by such an approach.

Figure 7:
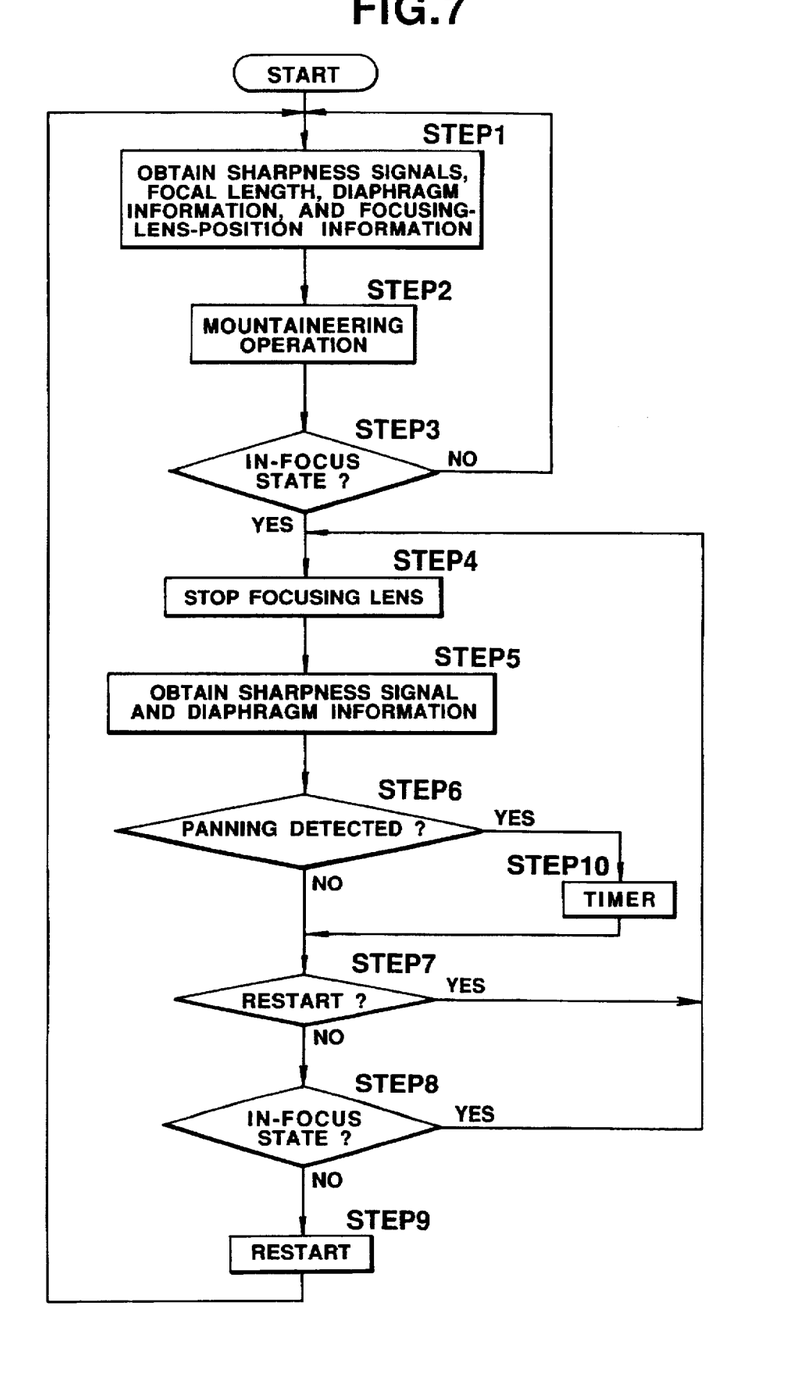
FIG. 7 is a flowchart illustrating another embodiment of the present invention.

FIG. 7 is a flowchart illustrating the control operation in such a case. In FIG. 7, steps in which the same processes as the processes shown in FIG. 2 are performed are indicated by the same reference numerals.

The processing shown in FIG. 7 differs from the processing shown in FIG. 2 in that timer processing step 10 for delaying the restart determination process for a predetermined time period is provided when panning has been detected in step 6.

That is, when panning has been detected in step 6, the process proceeds to step 10, in which a timer is operated. After the lapse of a setting time for the timer, the process proceeds to the restart processing in step 7. Thus, the drive of the focusing lens due to a misoperation when panning is performed can be prevented, and the focusing lens can be restarted after the completion of the panning operation. Hence, the present embodiment has the same functions and effects as the first embodiment.

As described above, according the automatic focusing device of the present embodiments, the stop of the focusing lens at a defocused position due to a misoperation during panning can be securely prevented by detecting the panning based on changes in the sharpness signal and the state of the diaphragm, and prohibiting the movement of the focusing lens when the panning has been detected. As a result, a very reliable automatic focusing device can be provided.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An automatic focusing device for controlling the drive of a focusing lens, said automatic focusing device comprising:

image pickup means for outputting an image signal by performing a photoelectric conversion of an image of an object;

extraction means for extracting, from the image signal, a predetermined focus signal relating to a state of focus of the image of an object;

a diaphragm for controlling the amount of light incident upon said image pickup means;

detecting means for detecting a change in said diaphragm; and control means for prohibiting the driving of the focusing lens in response to a predetermined change in a level of the focus signal simultaneously with a predetermined change in an aperture value of said diaphragm.

2. An automatic focusing device according to claim 1, wherein the focus signal is a signal corresponding to the sharpness of the image of the object extracted from the image signal, and wherein said extraction means comprises a band-pass filter.

3. An automatic focusing device according to claim 1, wherein said control means comprises means for prohibiting the drive of the focusing lens when panning has been detected.

4. An automatic focusing device according to claim 3, wherein said diaphragm has a stop value and wherein said control means determines that panning has been performed when the level of the focus signal and the stop value change by at least respective predetermined threshold values with respect to the level of the focus signal and the stop value when the focusing lens stops at a focus point.

5. An automatic focusing device according to claim 4, wherein said control means comprises means for changing the focus signal threshold value in accordance with the depth of field.

6. An automatic focusing device comprising:

signal detection means for detecting a predetermined focus signal relating to the state of focus and for outputting a focus signal;

focus adjusting means for adjusting the state of focus based on the output of said signal detection means;

a diaphragm for controlling the amount of incident light to said signal detection means;

detecting means for detecting a change in said diaphragm; and control means for prohibiting the driving of said focus adjusting means in response to a predetermined change in a level of the focus signal simultaneously with a predetermined change in an aperture value of said diaphragm.

7. An automatic focusing device according to claim 6, wherein the focus signal is a signal corresponding to the sharpness of the image of the object, and wherein said signal detection means comprises a band-pass filter.

8. An automatic focusing device according to claim 6, wherein said control means comprises means for prohibiting the drive of the focusing lens when panning has been detected.

9. An automatic focusing device according to claim 8, wherein said diaphragm has a stop value and wherein said control means determines that panning has been performed when the level of the focus signal and the stop value change by at least respective predetermined threshold values with respect to the level of the focus signal and the stop value when the focusing lens stops at a focus point.

10. A video camera apparatus capable of performing a focus adjusting operation, said video camera apparatus comprising:

image pickup means for outputting an image signal by performing photoelectric conversion of an image of an object;

exposure control means for controlling the amount of light incident upon said image pickup means;

first detection means for extracting, from the image signal, a focus signal relating to the state of focus of the image of an object;

focus adjusting means for adjusting the state of focus based on an output from said first detection means;

second detection means for detecting a signal corresponding to a change in said exposure control means ; and prohibition means for prohibiting a focus adjusting operation by said focus adjusting means when simultaneous changes exceeding respective predetermined threshold values are present in outputs from said first detection means and said second detection means.

11. A video camera apparatus according to claim 10, wherein said first detection means comprises a band-pass filter for extracting a signal corresponding to the sharpness of the image of the object from the image signal.

12. A video camera apparatus according to claim 10, wherein said prohibition means comprises means for detecting panning using outputs from said first detection means and said second detection means, and for prohibiting the drive of a focusing lens when panning has been detected.

13. A video camera apparatus according to claim 10, further comprising control means for restarting said focus adjusting means when the amount of a change in an output from said first detection means exceeds a predetermined threshold value, and the amount of a change in an output from said second detection means does not exceed a predetermined threshold value.

14. A video camera apparatus according to claim 12, wherein said first detection means comprises a band-pass filter for extracting a high-frequency component in the image signal, and a peak detection circuit for detecting a peak value in an output from said band-pass filter.

15. A video camera apparatus capable of performing a focus adjusting operation, said video camera apparatus comprising:

image pickup means for outputting an image signal by performing photoelectric conversion of an image of an object;

a diaphragm for controlling the amount of light incident upon said image pickup means;

first detection means for detecting, from the image signal, a signal relating to the contrast of the image of the object;

second detection means for detecting a signal corresponding to a change in an aperture value of said diaphragm; and prohibition means for prohibiting a focus adjusting operation for a predetermined time period when simultaneous changes exceeding respective predetermined threshold values are present in outputs from said first detection means and said second detection means.

16. A video camera apparatus according to claim 15, wherein said first detection means comprises a band-pass filter for extracting a signal corresponding to the sharpness of the image of the object from the image signal.

17. A video camera apparatus according to claim 15, wherein said prohibition means comprises means for detecting panning using outputs from said first detection means and said second detection means, and for prohibiting the drive of a focusing lens when panning has been detected.

18. A video camera apparatus according to claim 15, wherein said prohibition means restarts the focus adjusting operation after the lapse of the predetermined time period.

19. A video camera apparatus capable of performing a focus adjusting operation, said video camera apparatus comprising:

image pickup means for outputting an image signal by performing photoelectric conversion of an image of an object;

signal detection means for detecting, from the image signal, a signal relating to the contrast of the image of the object;

a diaphragm for controlling the amount of light incident upon said image pickup means;

detecting means for detecting a change in said diaphragm; and control means for controlling the drive and prohibition of a focus adjusting operation based on a change in the contrast of the image of the object simultaneously with a change in an aperture value of said diaphragm.

20. A video camera apparatus according to claim 19, wherein said diaphragm has a stop value and wherein said control means determines that panning has been performed when the level of an output from said signal detection means and the stop value have changed by at least respective predetermined amounts with respect to the level and the stop value when a focus point is detected.

21. A video camera apparatus according to claim 20, wherein said control means prohibits the focus adjusting operation for a predetermined time period when said control means has determined that panning has been performed.

22. A video camera apparatus, comprising:

image pickup means, having an exposure state, for outputting an image signal by performing photoelectric conversion of an image of an object;

exposure control means for controlling the exposure state of said image pickup means;

focus detection means for extracting, from the image signal, a focus signal relating to the state of focus of the image;

focus adjusting means for adjusting the state of focus based on an output of said focus detection means;

first detection means for detecting a signal corresponding to a change in the exposure state of said image pickup means; and prohibition means for prohibiting a focus adjusting operation of said focus adjusting means to hold a present state of focus when simultaneous changes exceeding respective predetermined threshold values are present in outputs from said focus detection means and said exposure control means.

23. A video camera apparatus according to claim 22, wherein the focus signal is a signal corresponding to the sharpness of the image, and wherein said focus detection means comprises a band-pass filter.

24. A video camera apparatus according to claim 22, wherein said exposure control means comprises a diaphragm for controlling the amount of light incident upon said image pickup means, and wherein said first detection means detects a change in said diaphragm.

25. A video camera apparatus according to claim 24, further comprising second detection means for detecting a change in the focus signal, wherein said prohibition means prohibits said focus adjusting means from adjusting the state of focus when the signal detected by said first detection means exceeds the first predetermined value and the change detected by said second detection means exceeds a second predetermined value.

26. A video camera apparatus according to claim 25, wherein the second predetermined value is variable in accordance with a depth of field.

27. A focus adjusting apparatus capable of performing a focus adjusting operation, said focus adjusting apparatus comprising:

image pickup means for outputting an image signal by performing photoelectric conversion of an image of an object;

signal detection means for detecting, from the image signal, a signal relating to the contrast of the image of the object;

a diaphragm for controlling the amount of light incident upon said image pickup means;

detecting means for detecting a change in an aperture value of said diaphragm; and control means for controlling the drive and prohibition of a focus adjusting operation based on a change in the contrast of the image of the object simultaneously with a change in an aperture value of said diaphragm and information of a depth of field.

28. An apparatus according to claim 27, wherein said prohibition means restarts the focus adjusting operation after the lapse of the predetermined time period.

29. An apparatus according to claim 27, wherein said control means determines that panning has been performed when the level of an output from said detection means and the stop value have changed by at least respective predetermined amounts with respect to the level and the stop value when a focus point is detected.

30. An apparatus according to claim 29, wherein said control means prohibits the focus adjusting operation for a predetermined time period when said control means has determined that panning has been performed.

* * * * *

UNITED STATES PATENT AND TRADEMARK OFFICE
CERTIFICATE OF CORRECTION

PATENT NO. : 5,798,793

DATED : August 25, 1998

INVENTOR(S): TAEKO TANAKA

It is certified that error appears in the above-identified patent and that said Letters Patent is hereby corrected as shown below:

ON COVER PAGE AT [56], ATTORNEY, AGENT, FIRM

"Cell," should read --Cella,--.

COLUMN 1

Line 38, "an" should read --a--.

COLUMN 5

Line 33, "TH1" should read --TH1, it--.

COLUMN 7

Line 12, after "according" insert --to--.

Signed and Sealed this

Sixth Day of April, 1999

Attest:

Q. TODD DICKINSON

Attesting Officer

Acting Commissioner of Patents and Trademarks